(12) United States Patent
Sato (10) Patent No.: US 11,577,627 B2
(45) Date of Patent: Feb. 14, 2023

(54) CONTROL DEVICE FOR FUEL CELL VEHICLE AND FUEL CELL VEHICLE

(71) Applicant: TOYOTA JIDOSHA KABUSHIKI KAISHA, Toyota (JP)

(72) Inventor: Hiromichi Sato, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 17/081,219

(22) Filed: Oct. 27, 2020

(65) Prior Publication Data

US 2021/0170910 A1    Jun. 10, 2021

(30) Foreign Application Priority Data

Dec. 6, 2019  (JP) .............................. JP2019-221628

(51) Int. Cl.
*B60L 58/30*     (2019.01)
*B60L 50/70*     (2019.01)
(Continued)

(52) U.S. Cl.
CPC ................ *B60L 58/30* (2019.02); *B60K 1/00* (2013.01); *B60L 50/70* (2019.02); *B60Q 9/00* (2013.01);
(Continued)

(58) Field of Classification Search
CPC ... B60K 1/00; B60L 2200/28; B60L 2240/12; B60L 2240/62; B60L 2240/642; B60L 2250/10; B60L 2250/16; B60L 50/70; B60L 50/72; B60L 58/25; B60L 58/30; B60Q 9/00; G01C 21/3415; G01C 21/3469; G01C 21/3697; H01M 2250/20; H01M 8/0432;
(Continued)

(56) References Cited

U.S. PATENT DOCUMENTS

2002/0192519 A1    12/2002  Fujita et al.
2004/0006414 A1*    1/2004  Suzuki .................. B60W 10/08
                                                                      180/65.28
(Continued)

FOREIGN PATENT DOCUMENTS

JP    2003-068342 A    3/2003
JP    2007-183205 A    7/2007
(Continued)

*Primary Examiner* — Adam A Arciero
(74) *Attorney, Agent, or Firm* — Finnegan, Henderson, Farabow, Garrett & Dunner, LLP (57) ABSTRACT

A control device for a fuel cell vehicle includes a power limiter limiting power of a fuel cell when a temperature correlation value correlated to a temperature of the fuel cell indicates that the temperature is equal to or higher than a temperature threshold, a calculation unit calculating a weight of a towed vehicle, a gradient acquirer acquiring upward gradients at respective points on a planned traveling route, a predictor predicting whether the power of the fuel cell is limited when the fuel cell vehicle is traveling along the planned traveling route in a towing travel state, and a controller issuing, when the predictor predicts that the power of the fuel cell is limited, an alert that a vehicle speed of the fuel cell vehicle is expected to decrease when the fuel cell vehicle is traveling along the planned traveling route in the towing travel state.

15 Claims, 10 Drawing Sheets

(51) Int. Cl.
*B60K 1/00* (2006.01)
*B60Q 9/00* (2006.01)
*H01M 8/04992* (2016.01)
*H01M 8/04858* (2016.01)
*H01M 8/0432* (2016.01)
*G01C 21/34* (2006.01)

(52) U.S. Cl.
CPC ...... *G01C 21/3469* (2013.01); *H01M 8/0432* (2013.01); *H01M 8/04932* (2013.01); *H01M 8/04992* (2013.01); *H01M 2250/20* (2013.01)

(58) Field of Classification Search
CPC ......... H01M 8/04701; H01M 8/04932; H01M 8/0494; H01M 8/04992; Y02T 10/70; Y02T 10/72; Y02T 90/16; Y02T 90/40
See application file for complete search history.

(56) References Cited

U.S. PATENT DOCUMENTS

| | | | |
|---|---|---|---|
| 2006/0222916 | A1* | 10/2006 | Norimatsu ........ H01M 8/04888 429/432 |
| 2010/0235039 | A1 | 9/2010 | Kajigai et al. |
| 2016/0214609 | A1* | 7/2016 | Yamaoka ................ B60Q 9/00 |
| 2019/0005183 | A1 | 1/2019 | Nada |
| 2020/0070801 | A1* | 3/2020 | Staats .................... B60L 58/12 |
| 2020/0086749 | A1* | 3/2020 | Suzuki ................ B60W 30/162 |

FOREIGN PATENT DOCUMENTS

| | | |
|---|---|---|
| JP | 2010-216856 A | 9/2010 |
| JP | 2017-007442 A | 1/2017 |
| JP | 2017-007443 A | 1/2017 |
| JP | 2019-009953 A | 1/2019 |
| WO | WO2015-025362 A1 | 2/2015 |
| WO | WO-2018155082 A1 * | 8/2018 ............ B60K 6/387 |

* cited by examiner

VEHICLE SPEED MAY GREATLY DECREASE ON SLOPE. — D6
PLEASE AVOID DRIVING ALONG NAVIGATION ROUTE.
— 9

FIG. 8B

VEHICLE SPEED MAY DECREASE ON SLOPE. — D7
SYSTEM RECOMMENDS THAT YOU AVOID DRIVING
ALONG NAVIGATION ROUTE.
— 9

CONTROL DEVICE FOR FUEL CELL VEHICLE AND FUEL CELL VEHICLE

INCORPORATION BY REFERENCE

The disclosure of Japanese Patent Application No. 2019-221628 filed on Dec. 6, 2019 including the specification, drawings and abstract is incorporated herein by reference in its entirety.

BACKGROUND

1. Technical Field

The present disclosure relates to a control device for a fuel cell vehicle, and also relates to the fuel cell vehicle.

2. Description of Related Art

Engine vehicles may travel while towing a towed vehicle (see, for example, Japanese Unexamined Patent Application Publication No. 2017-007442 (JP 2017-007442 A)).

SUMMARY

Similarly to the engine vehicles, fuel cell vehicles may travel while towing a towed vehicle. When the fuel cell is kept in a high-power state, the temperature of the fuel cell may increase excessively. In this case, the power of the fuel cell is limited to reduce the temperature of the fuel cell. When the fuel cell vehicle is traveling along a road having a large upward gradient while towing a heavy towed vehicle, the temperature of the fuel cell increases, and the power is limited. As a result, the vehicle speed may decrease.

The present disclosure provides a control device for a fuel cell vehicle, in which a decrease in the vehicle speed of the fuel cell vehicle that tows a towed vehicle can be predicted accurately and, when the decrease in the vehicle speed is predicted, a driver can be notified of the prediction result. The present disclosure also provides the fuel cell vehicle.

One aspect of the present disclosure provides a control device for a fuel cell vehicle. The control device for the fuel cell vehicle is a control device for a fuel cell vehicle including a fuel cell as an electric power source and a motor as a drive source. The control device includes a power limiter, a calculation unit, a gradient acquirer, a predictor, and a controller. The power limiter is configured to limit power of the fuel cell when a temperature correlation value correlated to a temperature of the fuel cell indicates that the temperature is equal to or higher than a temperature threshold. The calculation unit is configured to calculate a weight of a towed vehicle that is towed by the fuel cell vehicle. The gradient acquirer is configured to acquire upward gradients at respective points on a planned traveling route of the fuel cell vehicle. The predictor is configured to predict, based on the weight of the towed vehicle and the upward gradients, whether the power limiter limits the power of the fuel cell when the fuel cell vehicle is traveling along the planned traveling route in a towing travel state in which the fuel cell vehicle travels while towing the towed vehicle. The controller is configured such that, when the predictor predicts that the power of the fuel cell is limited, the controller issues, through a notifier mounted on the fuel cell vehicle, an alert that a vehicle speed of the fuel cell vehicle is expected to decrease when the fuel cell vehicle is traveling along the planned traveling route in the towing travel state.

By predicting whether the power of the fuel cell of the fuel cell vehicle that tows the towed vehicle is limited based on the weight of the towed vehicle and the upward gradients, a decrease in the vehicle speed that is caused by the power limitation can be predicted accurately. When the decrease in the vehicle speed is predicted, the driver can be notified of the prediction result. The description "issue an alert that a vehicle speed of the fuel cell vehicle is expected to decrease when the fuel cell vehicle is traveling along the planned traveling route in the towing travel state" is not limited to message display or voice output, but includes, for example, outputting a beeping sound indicating the alert from a loudspeaker to the driver in advance, turning ON a lighting device in a predetermined lighting pattern, and displaying a predetermined symbol or the like on a display.

In the aspect described above, the predictor may be configured to predict that the power of the fuel cell is limited when the weight of the towed vehicle is equal to or larger than a weight threshold and when at least one of the upward gradients at the respective points is equal to or larger than a gradient threshold.

In the aspect described above, the control device may further include an information acquirer configured to acquire towing travel state information including an inclination angle of a road where the fuel cell vehicle is traveling in the towing travel state, and a torque of the motor when the fuel cell vehicle is traveling in the towing travel state along the road having the inclination angle. The calculation unit may be configured to calculate the weight of the towed vehicle based on the towing travel state information.

In the aspect described above, the towing travel state information may include a vehicle speed of the fuel cell vehicle when the fuel cell vehicle is traveling in the towing travel state along the road having the inclination angle.

In the aspect described above, the control device may further include a storage that stores a map that defines a relationship among the torque, the inclination angle, the vehicle speed, and the weight of the towed vehicle. The calculation unit may be configured to calculate the weight of the towed vehicle with reference to the map.

In the aspect described above, the towing travel state information may include a weight of the fuel cell vehicle, and an air resistance of the fuel cell vehicle, an acceleration of the fuel cell vehicle, and a gear ratio of a transmission of the fuel cell vehicle when the fuel cell vehicle is traveling in the towing travel state along the road having the inclination angle.

In the aspect described above, the control device may further include a storage that stores an arithmetic expression that defines a relationship among the torque, the inclination angle, the weight, the air resistance, the acceleration, and the gear ratio of the fuel cell vehicle, and the weight of the towed vehicle. The calculation unit may be configured to calculate the weight of the towed vehicle based on the arithmetic expression.

In the aspect described above, the controller may be configured to issue, through the notifier, an alert that provides a prompt to avoid traveling along the planned traveling route.

In the aspect described above, the controller may be configured to issue an alert with emphasis through the notifier as the weight of the towed vehicle increases.

In the aspect described above, the controller may be configured to issue an alert with emphasis through the notifier as the upward gradients increase.

In the aspect described above, the gradient acquirer may be configured to acquire the upward gradients from a navigation device in which the planned traveling route is set.

In the aspect described above, the controller may be configured such that, when the predictor predicts that the power of the fuel cell is limited, the controller issues, through the notifier, an alert that provides a prompt to change the planned traveling route set in the navigation device.

In the aspect described above, the fuel cell vehicle may be a passenger automobile.

Another aspect of the present disclosure provides a fuel cell vehicle including a fuel cell, a motor, and the control device for the fuel cell vehicle.

According to the present disclosure, it is possible to provide the control device for a fuel cell vehicle, in which a decrease in the vehicle speed of the fuel cell vehicle that tows a towed vehicle can be predicted accurately and, when the decrease in the vehicle speed is predicted, a driver can be notified of the prediction result. According to the present disclosure, it is also possible to provide the fuel cell vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Structure of Fuel Cell Vehicle 1

Figure 1:
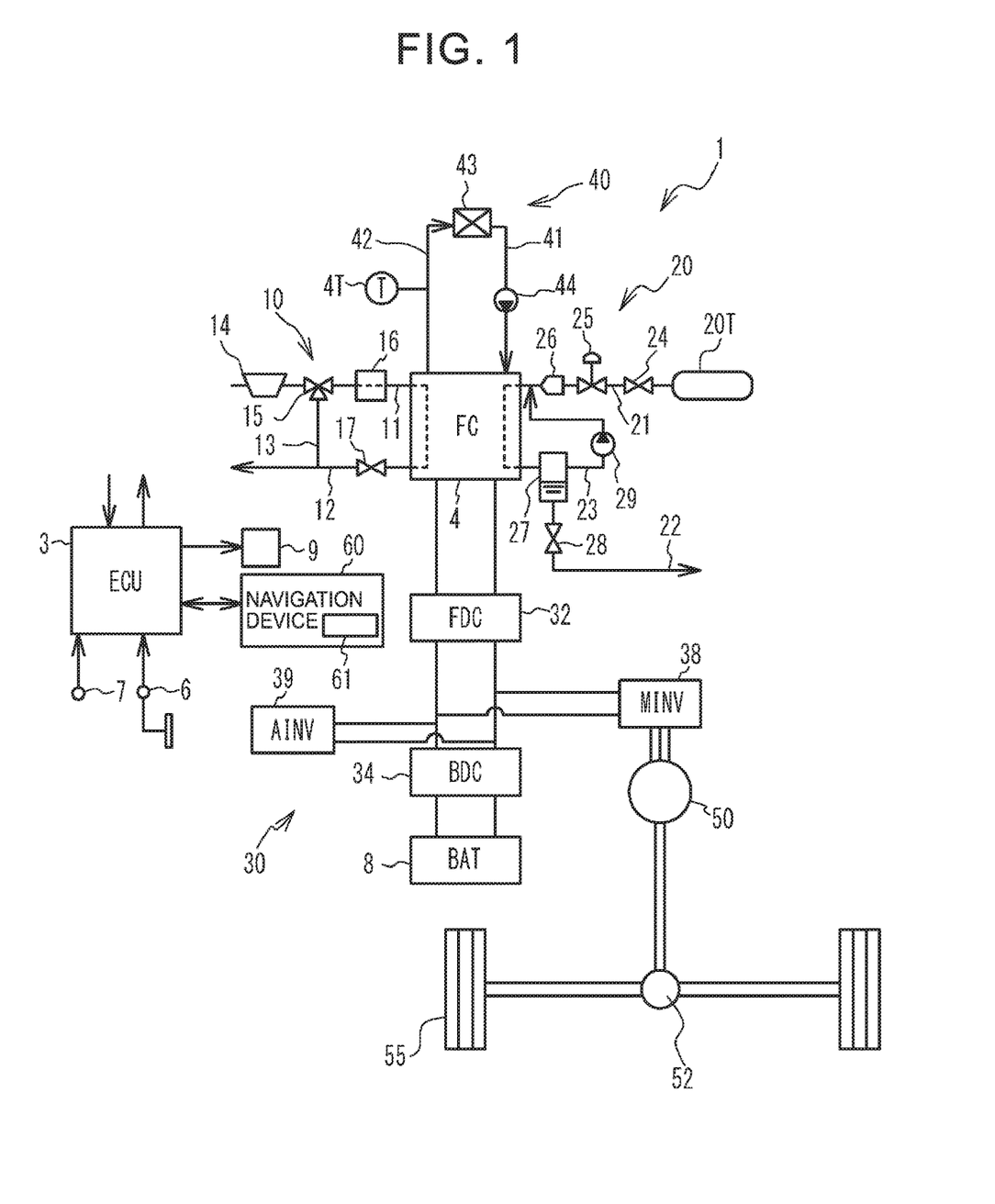
FIG. 1 is a structural diagram of a fuel cell vehicle.

FIG. 1 is a structural diagram of a fuel cell vehicle 1. The fuel cell vehicle 1 includes a fuel cell (hereinafter referred to as "FC") 4 as an electric power source, and a motor 50 as a drive source. The fuel cell vehicle 1 includes an electronic control unit (ECU) 3, the FC 4, a secondary battery (hereinafter referred to as "BAT") 8, an oxidant gas supply system 10, a fuel gas supply system 20, a power control system 30, and a cooling system 40. The fuel cell vehicle 1 further includes an accelerator operation amount sensor 6, an ignition switch 7, an instrument panel display 9, the motor 50 for traveling, a transmission 52, wheels 55, and a navigation device 60. The instrument panel display 9 is provided at a position where the instrument panel display 9 is operable by a driver in a vehicle cabin. The navigation device 60 has a touch-panel navigation display 61 operable by the driver.

The FC 4 is supplied with an oxidant gas and a fuel gas to generate electric power. The FC 4 includes a stack of a plurality of polymer-electrolyte single cells. Each single cell includes a membrane and electrode assembly and a pair of separators. The membrane and electrode assembly is a generator having electrodes arranged on both sides of a proton exchange membrane. The separators sandwich the membrane and electrode assembly. The proton exchange membrane is a polymer electrolyte membrane made of a fluorine or hydrocarbon resin material having a sulfonic group, and has excellent proton conductivity in a wet state. The electrode includes a carbon support and an ionomer, which is a solid polymer having a sulfonic group and has excellent proton conductivity in a wet state. The carbon support supports a catalyst for promoting power generating reaction (for example, platinum or a platinum-cobalt alloy). The single cells are provided with manifolds through which reactive gases and a coolant flow. The reactive gases flowing through the manifolds are supplied to power generating areas of the single cells via gas channels provided in the single cells.

The oxidant gas supply system 10 supplies air containing oxygen to the FC 4 as the oxidant gas. The oxidant gas supply system 10 includes a supply pipe 11, a discharge pipe 12, a bypass pipe 13, an air compressor 14, a bypass valve 15, an intercooler 16, and a back pressure regulating valve 17. The supply pipe 11 is connected to a cathode inlet manifold of the FC 4. The discharge pipe 12 is connected to a cathode outlet manifold of the FC 4. The bypass pipe 13 communicates the supply pipe 11 with the discharge pipe 12. The bypass valve 15 is provided at a part where the supply pipe 11 and the bypass pipe 13 are connected together. The bypass valve 15 changes a communication condition between the supply pipe 11 and the bypass pipe 13. The air compressor 14, the bypass valve 15, and the intercooler 16 are arranged in this order from an upstream side on the supply pipe 11. The back pressure regulating valve 17 is arranged on the discharge pipe 12 on an upstream side of a part where the discharge pipe 12 and the bypass pipe 13 are connected together. The air compressor 14 supplies air containing oxygen to the FC 4 via the supply pipe 11 as the oxidant gas. The oxidant gas supplied to the FC 4 is discharged via the discharge pipe 12. The intercooler 16 cools the oxidant gas to be supplied to the FC 4. The back pressure regulating valve 17 regulates a back pressure on a cathode side of the FC 4. The ECU 3 controls driving of the air compressor 14, the bypass valve 15, and the back pressure regulating valve 17. The ECU 3 can adjust the flow rate of the oxidant gas to be supplied to the FC 4 by controlling the rotation speed of the air compressor 14. The ECU 3 can adjust the flow rate of the oxidant gas to be supplied to the FC 4 and the flow rate of the oxidant gas to be bypassed by controlling the opening degrees of the bypass valve 15 and the back pressure regulating valve 17.

The fuel gas supply system 20 supplies a hydrogen gas to the FC 4 as the fuel gas. The fuel gas supply system 20 includes a tank 20T, a supply pipe 21, a discharge pipe 22, a circulation pipe 23, a tank valve 24, a pressure regulating valve 25, an injector (hereinafter referred to as "INJ") 26, a gas-liquid separator 27, a drain valve 28, and a hydrogen circulation pump (hereinafter referred to as "HP") 29. The tank 20T and an anode inlet manifold of the FC 4 are connected by the supply pipe 21. The tank 20T stores the hydrogen gas serving as the fuel gas. The discharge pipe 22 is connected to an anode outlet manifold of the FC 4. The circulation pipe 23 communicates the gas-liquid separator 27 with the supply pipe 21. The tank valve 24, the pressure regulating valve 25, and the INJ 26 are arranged in this order from an upstream side on the supply pipe 21. The opening degree of the pressure regulating valve 25 is adjusted while the tank valve 24 is open, and the INJ 26 injects the fuel gas. Thus, the fuel gas is supplied to the FC 4. The gas-liquid separator 27 and the drain valve 28 are arranged in this order from an upstream side on the discharge pipe 22. The gas-liquid separator 27 separates water from the fuel gas discharged from the FC 4, and stores the separated water. The water stored in the gas-liquid separator 27 is discharged to the outside of the fuel cell vehicle 1 via the discharge pipe 22 by opening the drain valve 28. The circulation pipe 23 is used for returning the fuel gas to the FC 4. The upstream end of the circulation pipe 23 is connected to the gas-liquid separator 27, and the HP 29 is arranged on the circulation pipe 23. The fuel gas discharged from the FC 4 is appropriately pressurized by the HP 29 and guided to the supply pipe 21. The ECU 3 controls driving of the tank valve 24, the pressure regulating valve 25, the INJ 26, the drain valve 28, and the HP 29.

The power control system 30 includes a fuel cell direct current to direct current (DC/DC) converter (hereinafter referred to as "FDC") 32, a battery DC/DC converter (hereinafter referred to as "BDC") 34, a motor inverter (hereinafter referred to as "MINV") 38, and an auxiliary device inverter (hereinafter referred to as "AINV") 39. The FDC 32 controls an output current of the FC 4 based on a required current value transmitted from the ECU 3, and adjusts DC power from the FC 4 and outputs the DC power to the MINV 38 and the AINV 39. The BDC 34 adjusts DC power from the BAT 8 and outputs the DC power to the MINV 38 and the AINV 39. The BAT 8 can be charged with electric power generated by the FC 4. The MINV 38 converts the input DC power into three-phase alternating current (AC) power, and supplies the AC power to the motor 50. The motor 50 rotates the wheels 55 via the transmission 52 such that the fuel cell vehicle 1 travels. The electric power of the FC 4 and the BAT 8 can be supplied to load devices via the AINV 39. The load devices include auxiliary devices for the FC 4 and auxiliary devices for the vehicle. The auxiliary devices for the FC 4 include the air compressor 14, the bypass valve 15, the back pressure regulating valve 17, the tank valve 24, the pressure regulating valve 25, the INJ 26, the drain valve 28, and the HP 29. Examples of the auxiliary devices for the vehicle include an air conditioner, a lighting system, and a hazard warning signal lamp.

The cooling system 40 cools the FC 4 by circulating the coolant along a predetermined path. The cooling system 40 includes a supply pipe 41, a discharge pipe 42, a radiator 43, a water pump (hereinafter referred to as "WP") 44, and a temperature sensor 4T. The supply pipe 41 is connected to a coolant supply manifold of the FC 4. The discharge pipe 42 is connected to a coolant discharge manifold of the FC 4. The radiator 43 is connected to the supply pipe 41 and the discharge pipe 42. The WP 44 is arranged on the supply pipe 41. The WP 44 circulates the coolant that is a cooling medium between the FC 4 and the radiator 43 via the supply pipe 41 and the discharge pipe 42. The radiator 43 cools the coolant discharged from the FC 4 by exchanging heat between the coolant and outside air. The ECU 3 controls driving of the WP 44.

The temperature sensor 4T is provided on the discharge pipe 42, and detects the temperature of the coolant discharged from the FC 4 but not flowing into the radiator 43. The ECU 3 acquires a detection result from the temperature sensor 4T. Since the temperature sensor 4T detects the temperature of the coolant discharged from the FC 4 but not flowing into the radiator 43, the temperature of the FC 4 increases as the detected temperature increases. The coolant temperature detected by the temperature sensor 4T is an example of a temperature correlation value correlated to the temperature of the FC 4. Although the coolant temperature detected by the temperature sensor 4T is used as the temperature of the FC 4, the present disclosure is not limited to the coolant temperature. For example, the temperature of the FC 4 may be detected by a sensor configured to directly detect the temperature of the FC 4.

The ECU 3 includes a central processing unit (CPU), a read only memory (ROM), and a random access memory (RAM). The accelerator operation amount sensor 6, the ignition switch 7, the instrument panel display 9, the air compressor 14, the bypass valve 15, the back pressure regulating valve 17, the tank valve 24, the pressure regulating valve 25, the INJ 26, the drain valve 28, the HP 29, the FDC 32, and the BDC 34 are electrically connected to the ECU 3. The ECU 3 calculates power required in the FC 4 based on, for example, a detection value from the accelerator operation amount sensor 6, driving conditions of the auxiliary devices for the vehicle and the auxiliary devices for the FC 4, and electric power stored in the BAT 8, and calculates a current value required in the FC 4 based on the required power. The ECU 3 controls the flow rates of the oxidant gas and the fuel gas to be supplied to the FC 4 by controlling the air compressor 14 and the INJ 26 based on the power required in the FC 4. The ECU 3 controls the output current of the FC 4 by controlling the FDC 32 based on the current value required in the FC 4. The ECU 3 is an example of a control device for the fuel cell vehicle 1, which controls the overall fuel cell vehicle 1. The ECU 3 includes a power limiter, a calculation unit, a gradient acquirer, a predictor, and a controller. The ECU 3 may further include an information acquirer and a storage.

Towing

Figure 2:
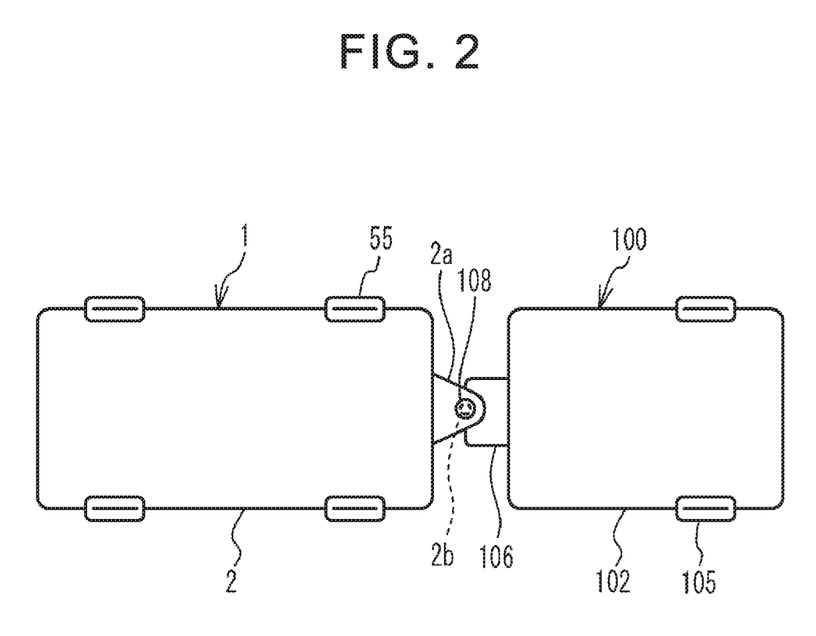
FIG. 2 is a diagram illustrating the fuel cell vehicle and a towed vehicle towed by the fuel cell vehicle.

FIG. 2 is a diagram illustrating the fuel cell vehicle 1 and a towed vehicle 100 towed by the fuel cell vehicle 1. The fuel cell vehicle 1 has a hitch 2a at the rear end of a vehicle body 2. The hitch 2a protrudes rearward. For example, the hitch 2a includes a hitch ball 2b having a spherical shape at the upper end of a columnar member provided upright in a vertical direction.

The towed vehicle 100 is also called "trailer". The towed vehicle 100 includes a body 102, wheels 105, a coupling member 106, and a coupler 108. The coupler 108 is provided at the front end of the coupling member 106. The coupler 108 has a spherical socket that receives the hitch ball 2b. With the coupler 108 receiving the hitch ball 2b, the towed vehicle 100 is coupled to the fuel cell vehicle 1 in a turnable manner. The fuel cell vehicle 1 can travel in this state.

Power Limitation

Although the FC 4 is cooled by the coolant, the coolant temperature increases and the temperature of the FC 4 also increases when the FC 4 is kept in a high-power state and the amount of heat received by the coolant from the FC 4 exceeds the heat radiation capacity of the radiator 43 for the coolant. When the temperature of the FC 4 increases excessively, the proton exchange membrane or other components of the FC 4 may be melted. When the temperature detected by the temperature sensor 4T is equal to or higher than a predetermined threshold, the ECU 3 limits the power of the FC 4 such that maximum power of the FC 4 is smaller than maximum rated power of the FC 4. This process is an example of a process to be executed by the power limiter configured to limit the power of the FC 4 when the temperature correlation value correlated to the temperature of the FC 4 indicates that the temperature of the FC 4 is equal to or higher than a temperature threshold. Specifically, the ECU 3 limits the power of the FC 4 and reduces the temperature by reducing the rotation speed of the air compressor 14 and the fuel gas injection amount of the INJ 26 to reduce the oxidant gas and the fuel gas to be supplied to the FC 4 as compared to those in a normal condition.

For example, when the fuel cell vehicle 1 travels while towing the towed vehicle 100, the temperature may increase due to an increase in the power of the FC 4 depending on the weight of the towed vehicle 100 and an upward gradient of a traveling road. Therefore, the power of the FC 4 may be limited. Thus, the vehicle speed of the fuel cell vehicle 1 may decrease as compared to a vehicle speed in a case where the power of the FC 4 is not limited. In this embodiment, the ECU 3 executes control such that a driver of the fuel cell vehicle 1 that tows the towed vehicle 100 recognizes in advance a situation in which the vehicle speed may decrease.

Control of ECU 3

Figure 3:
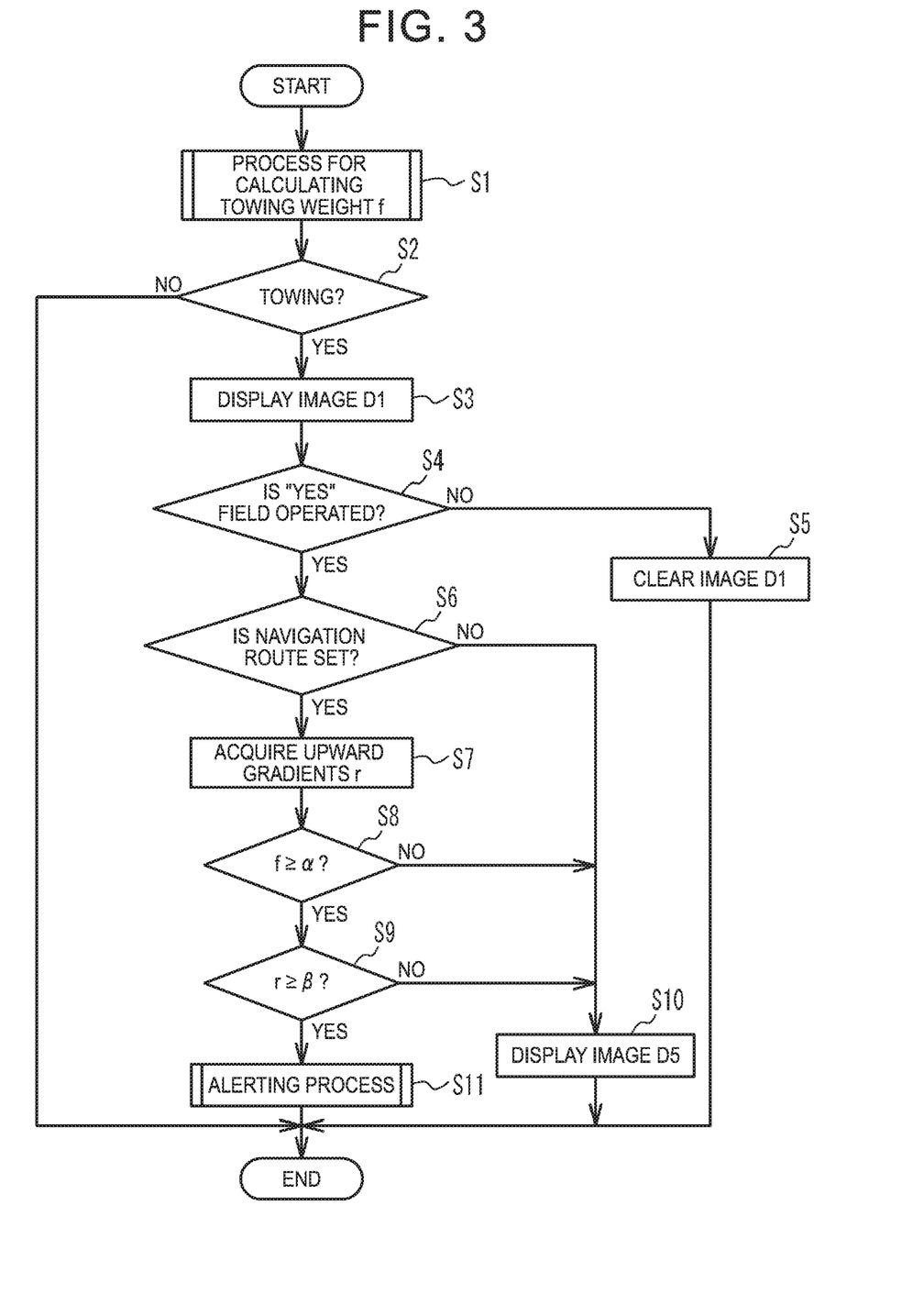
FIG. 3 is a flowchart illustrating an example of control to be executed by an electronic control unit (ECU)
Figure 4:
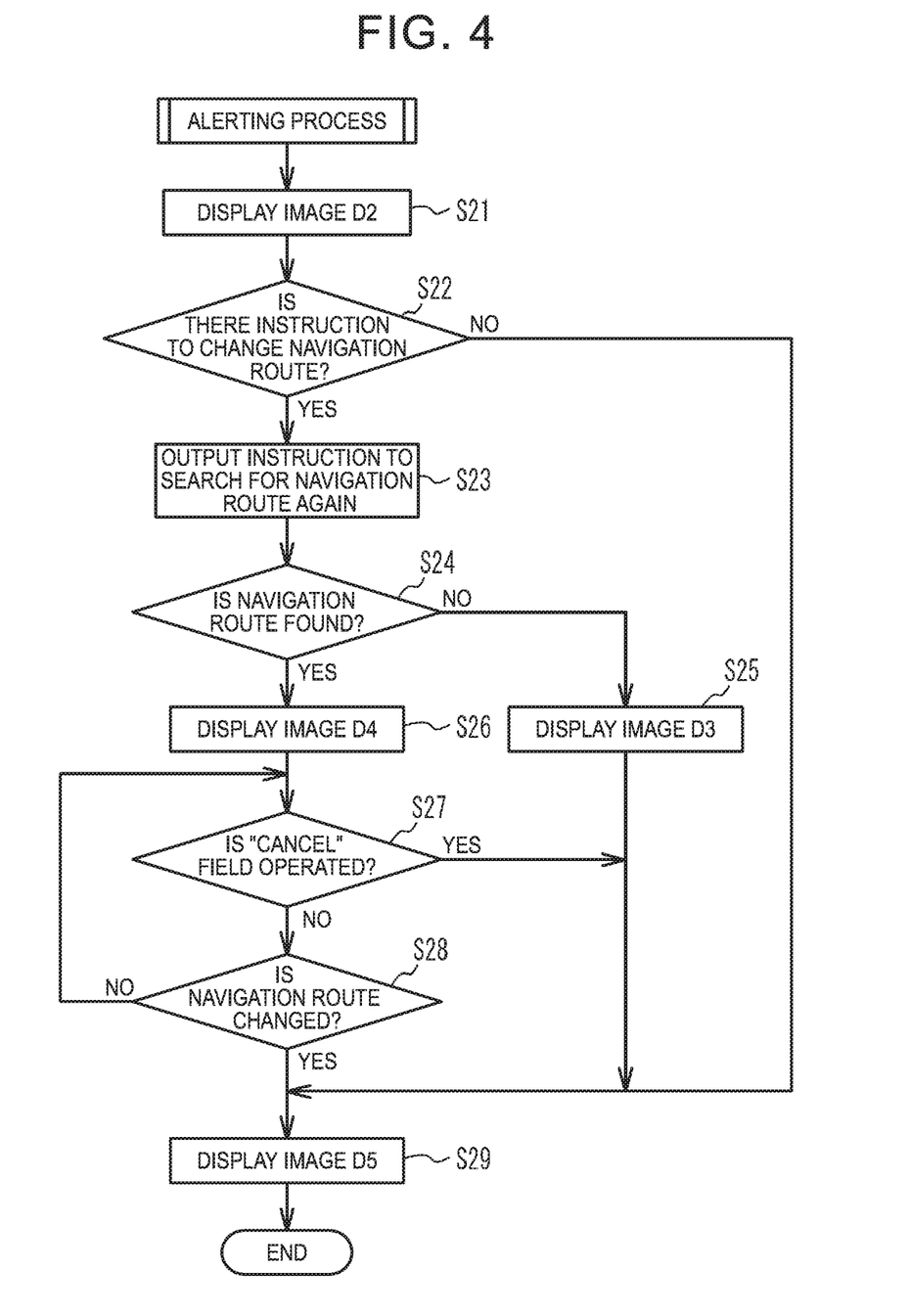
FIG. 4 is a flowchart illustrating an example of an alerting process.

FIG. 3 is a flowchart illustrating an example of control to be executed by the ECU 3. FIG. 4 is a flowchart illustrating an example of an alerting process described later. FIG. 5A to FIG. 5E illustrate examples of images D1 to D5 to be displayed on the instrument panel display 9, respectively. When anyone of the images D1 to D5 is displayed on the instrument panel display 9, a message in the image is output by voice from a loudspeaker in the vehicle cabin of the fuel cell vehicle 1. The instrument panel display 9 and the loudspeaker in the vehicle cabin are examples of a notifier.

First, the control to be executed by the ECU 3 is described with reference to FIG. 3. This control is repeated in every predetermined time. The ECU 3 executes a process for calculating a towing weight f of a towed vehicle that may be towed by the fuel cell vehicle 1 (Step S1). The process of Step S is an example of a process to be executed by the calculation unit. A specific method for calculating the towing weight f is described later.

Next, the ECU 3 determines whether the fuel cell vehicle 1 is towing a towed vehicle based on a result of the calculation of the towing weight f (Step S2). Specifically, when the calculated towing weight f is equal to or larger than a predetermined value, the ECU 3 determines that the fuel cell vehicle 1 is towing a towed vehicle. When the towing weight f is smaller than the predetermined value, the ECU 3 determines that the fuel cell vehicle 1 is not towing any towed vehicle. For example, the predetermined value is set larger than a maximum authorized freight mass of the fuel cell vehicle 1. When the result of the determination in Step S2 is "No", the control is terminated.

Figure 5A:
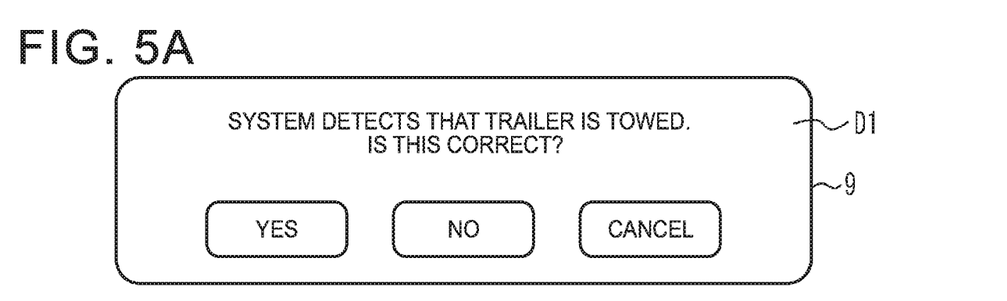
FIG. 5A illustrates an example of an image to be displayed on an instrument panel display.

When the result of the determination in Step S2 is "Yes", the ECU 3 causes the instrument panel display 9 to display the image D1 for prompting the driver to check the towed vehicle 100 (Step S3). The image D1 shows a message "System detects that trailer is towed. Is this correct?" and "Yes", "No", and "Cancel" fields. The ECU 3 determines whether the "Yes" field on the image D1 is operated (Step S4). When the result of the determination in Step S4 is "No", that is, when the "No" or "Cancel" field is operated, the ECU 3 clears the image D1 (Step S5), and terminates the control.

Figure 5B:
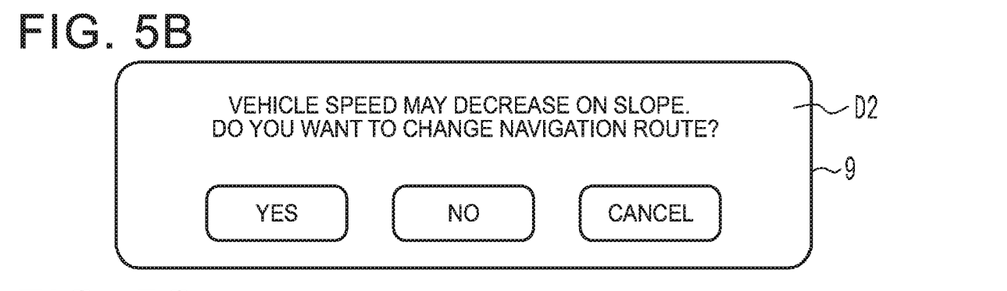
FIG. 5B illustrates another example of the image to be displayed on the instrument panel display.
Figure 5C:
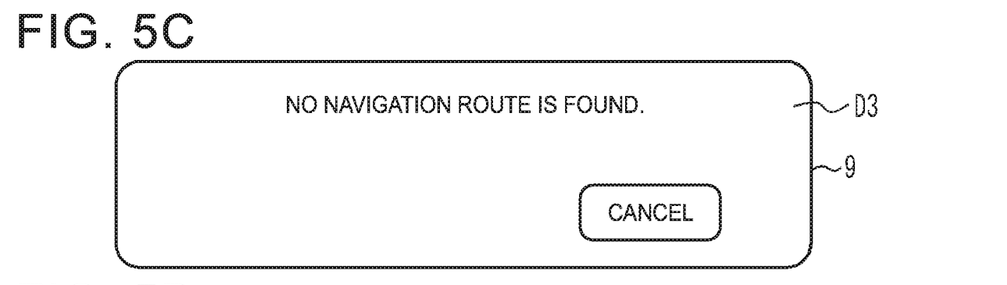
FIG. 5C illustrates another example of the image to be displayed on the instrument panel display.
Figure 5D:
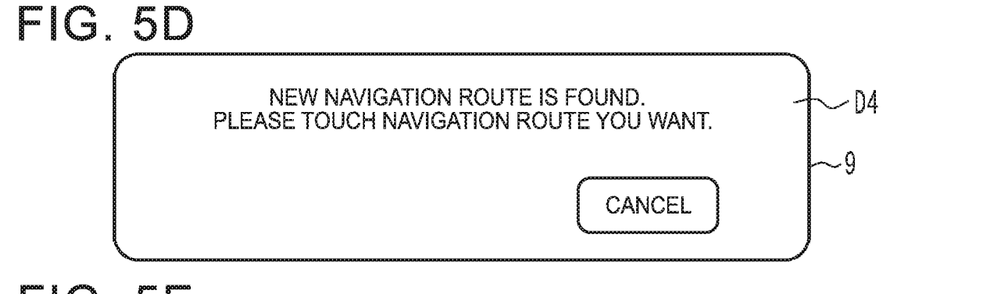
FIG. 5D illustrates another example of the image to be displayed on the instrument panel display.
Figure 5E:
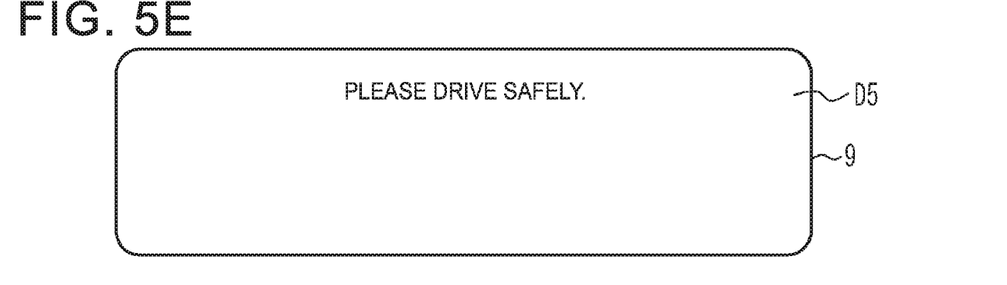
FIG. 5E illustrates another example of the image to be displayed on the instrument panel display.

When the result of the determination in Step S4 is "Yes", the ECU 3 determines whether a navigation route is already set in the navigation device 60 (Step S6). When the result of the determination in Step S6 is "No", the ECU 3 causes the instrument panel display 9 to display the image D5 for prompting the driver to drive safely (Step S10). For example, the image D5 shows a message "Please drive safely." The image D5 is cleared after the image D5 is displayed for a predetermined time on the instrument panel display 9. Then, the control is terminated.

When the result of the determination in Step S6 is "Yes", the ECU 3 acquires upward gradients r [%] at respective points on the navigation route set in the navigation device 60 (Step S7). The process of Step S7 is an example of a process to be executed by the gradient acquirer.

Next, the ECU 3 determines whether the towing weight f is equal to or larger than a threshold α (Step S8). For example, the threshold α is 2000 kg. The threshold α is an example of a weight threshold. When the result of the determination in Step S8 is "No", the process of Step S10 is executed, and the control is terminated.

When the result of the determination in Step S8 is "Yes", the ECU 3 determines whether the upward gradient r is equal to or larger than a threshold β at any point on the navigation route (Step S9). For example, the threshold β is 8%. The threshold β is an example of a gradient threshold. The thresholds α and β in Steps S8 and S9 are set to a towing weight and an upward gradient at which the ECU 3 predicts that the temperature of the FC 4 increases and the power of the FC 4 is limited when the fuel cell vehicle 1 is traveling along the navigation route while towing the towed vehicle. For example, the thresholds α and β are set based on results of experiments. The processes of Steps S8 and S9 are examples of a process to be executed by the predictor configured to predict whether the power limiter limits the power of the FC 4 when the fuel cell vehicle 1 is traveling along the navigation route. When the result of the determination in Step S9 is "No", the process of Step S10 is executed, and the control is terminated. The order of Steps S8 and S9 is not particularly limited.

When the result of the determination in Step S9 is "Yes", the ECU 3 executes the alerting process (Step S11). The alerting process is a process for alerting the driver that the vehicle speed may decrease. The ECU 3 can accurately predict that the power of the FC 4 may be limited and the vehicle speed may decrease based on the towing weight f and the upward gradients r on the navigation route. When the decrease in the vehicle speed is predicted, the driver can be notified of the prediction result in advance. Details of the alerting process are described below.

Alerting Process

In the alerting process illustrated in FIG. 4, the ECU 3 causes the instrument panel display 9 to display the image D2 (Step S21). The image D2 notifies the driver that the vehicle speed may decrease on a slope, and prompts the driver to decide whether to change a current navigation route set in the navigation device 60. For example, the image D2 shows a message "Vehicle speed may decrease on slope. Do you want to change navigation route?" and "Yes", "No", and "Cancel" fields. Since the driver can recognize in advance that the vehicle speed may decrease, driver's discomfort and anxiety can be reduced even if the vehicle speed actually decreases. The process of Step S21 is an example of a process to be executed by the controller. The image D2 is an example of an alert that the vehicle speed of the fuel cell vehicle 1 may decrease when the fuel cell vehicle 1 is traveling along a planned traveling route in a towing travel state, and is also an example of an alert that provides a prompt to change the planned traveling route set in the navigation device 60.

Next, the ECU 3 determines whether an instruction is made to change the navigation route (Step S22). When the result of the determination in Step S22 is "No", that is, when the "No" or "Cancel" field on the image D2 is operated, the ECU 3 causes the instrument panel display 9 to display the image D5 (Step S29), and terminates the control.

When the result of the determination in Step S22 is "Yes", that is, when the "Yes" field on the image D2 is operated, the ECU 3 outputs, to the navigation device 60, an instruction to search again for a new navigation route without a point where the gradient r is equal to or larger than the threshold s (Step S23).

Next, the ECU 3 communicates with the navigation device 60 to determine whether the navigation device 60 finds a navigation route (Step S24). When the result of the determination in Step S24 is "No", the ECU 3 causes the instrument panel display 9 to display the image D3 for notifying the driver that a new navigation route is not found (Step S25). For example, the image D3 shows a message "No navigation route is found." Then, the ECU 3 executes the process of Step S29, and terminates the control.

Figure 6:
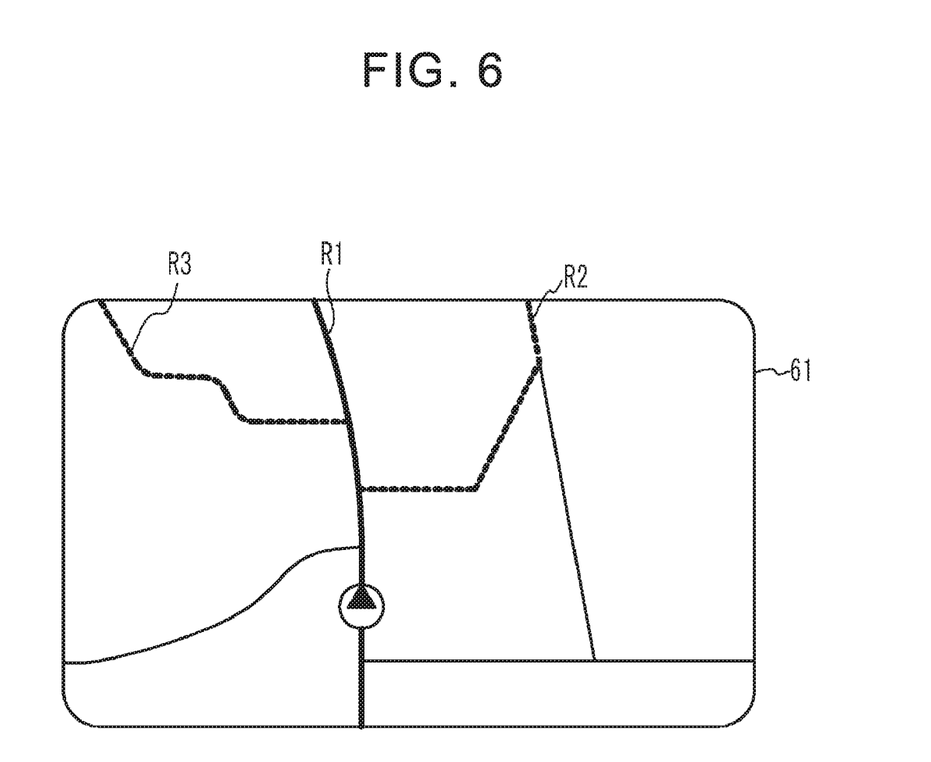
FIG. 6 is a diagram of an example of an image to be displayed on a navigation display when a new navigation route is found.

When the result of the determination in Step S24 is "Yes", the ECU 3 causes the instrument panel display 9 to display the image D4 for prompting the driver to change the current navigation route to the new navigation route (Step S26). For example, the image D4 shows a message "New navigation route is found. Please touch navigation route you want." and a "Cancel" field. The process of Step S26 is an example of a process to be executed by the controller. FIG. 6 is a diagram of an example of an image to be displayed on the navigation display 61 when the new navigation route is found. FIG. 6 illustrates a currently set navigation route R1 and newly found navigation routes R2 and R3. The driver can change the navigation route by touching the navigation route R2 or R3.

Next, the ECU 3 determines whether the "Cancel" field on the image D4 is operated (Step S27). When the result of the determination in Step S27 is "Yes", the ECU 3 executes the process of Step S29, and terminates the control.

When the result of the determination in Step S27 is "No", the ECU 3 determines whether the navigation route is changed based on a signal from the navigation device 60 (Step S28). When the result of the determination in Step S28 is "No", the process of Step S27 is executed again. When the result of the determination in Step S28 is "Yes", the ECU 3 executes the process of Step S29, and terminates the control.

Modified Examples of Alerting Process

Figure 7A:
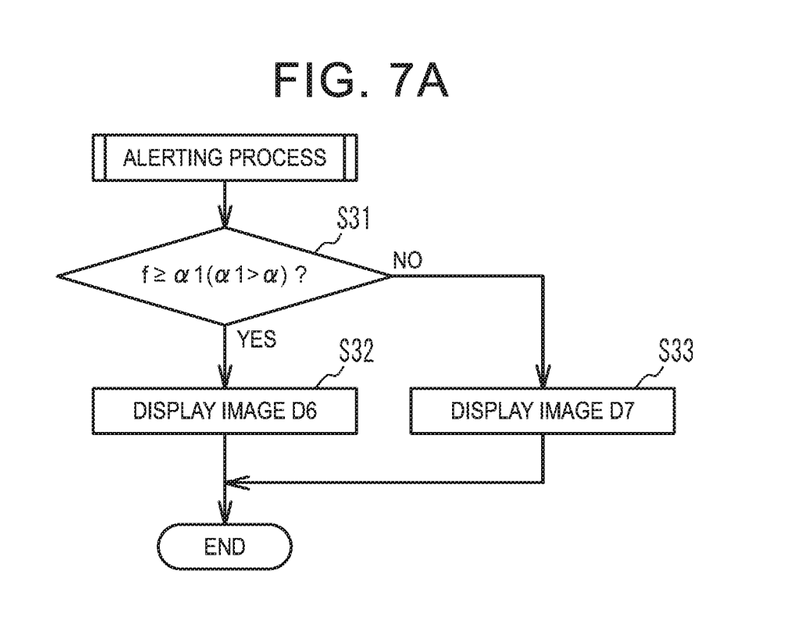
FIG. 7A is a flowchart illustrating a first modified example of the alerting process.
Figure 7B:
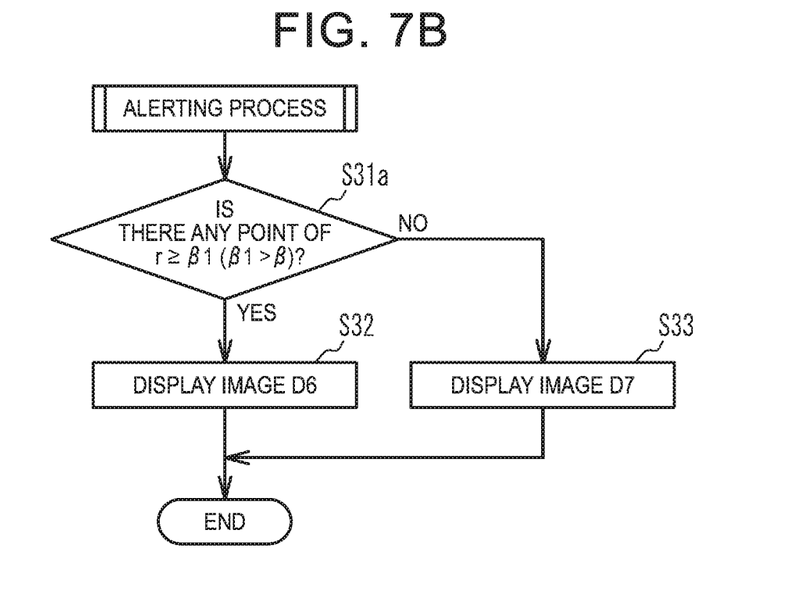
FIG. 7B is a flowchart illustrating a second modified example of the alerting process.
Figure 8A:
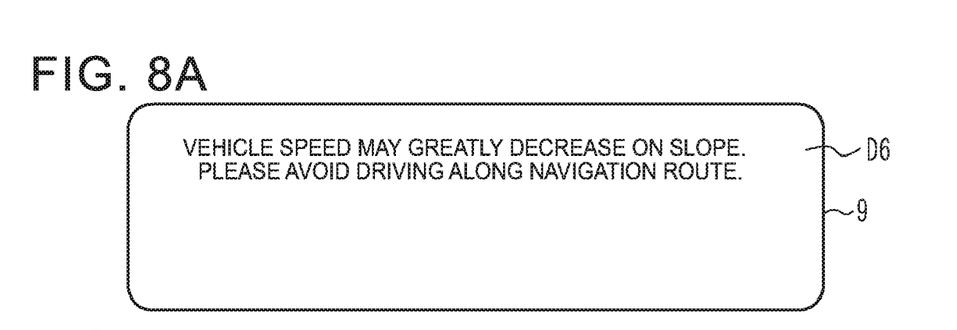
FIG. 8A illustrates another example of the image to be displayed on the instrument panel display.
Figure 8B:
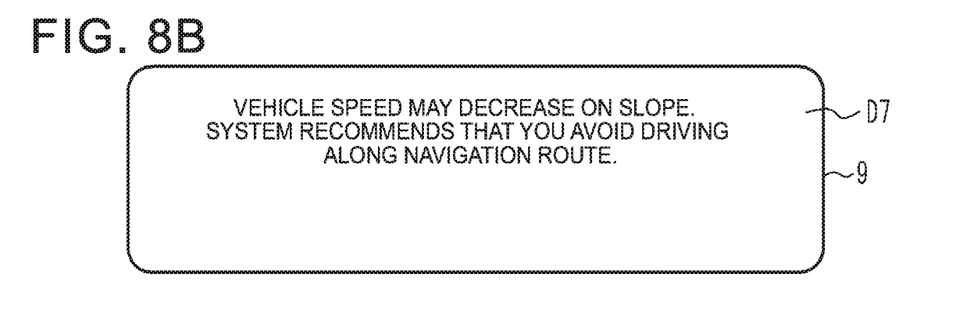
FIG. 8B illustrates another example of the image to be displayed on the instrument panel display.

Next, a plurality of modified examples of the alerting process are described. FIG. 7A is a flowchart illustrating a first modified example of the alerting process. FIG. 7B is a flowchart illustrating a second modified example of the alerting process. FIG. 8A and FIG. 8B illustrate examples of images D6 and D7 to be displayed on the instrument panel display 9. When the image D6 or D7 is displayed on the instrument panel display 9, a message in the image is output by voice from the loudspeaker in the vehicle cabin of the fuel cell vehicle 1.

First, the first modified example of the alerting process is described. As illustrated in FIG. 7A, the ECU 3 determines whether the towing weight f is equal to or larger than a threshold α1 (Step S31). The threshold α1 is larger than the threshold α by a predetermined value. For example, the threshold α1 is 3000 kg. The threshold α1 is an example of the weight threshold. When the result of the determination in Step S31 is "Yes", that is, when the towing weight f is relatively large, the ECU 3 causes the instrument panel display 9 to display the image D6 (Step S32). When the result of the determination in Step S31 is "No", that is, when the towing weight f is equal to or larger than the threshold α but smaller than the threshold α1, the ECU 3 causes the instrument panel display 9 to display the image D7 (Step S33). As compared to the image D7, the image D6 emphasizes the possibility of the decrease in the vehicle speed, and also emphasizes avoidance of traveling along the navigation route. For example, the image D6 shows a message "Vehicle speed may greatly decrease on slope. Please avoid driving along navigation route." For example, the image D7 shows a message "Vehicle speed may decrease on slope. System recommends that you avoid driving along navigation route." In this manner, the alert may be issued with emphasis as the towing weight f increases without a prompt to change the navigation route already set in the navigation device 60. The process of Step S32 is an example of a process to be executed by the controller. The images D6 and D7 are examples of the alert that the vehicle speed of the fuel cell vehicle 1 may decrease when the fuel cell vehicle 1 is traveling along a planned traveling route in a towing travel state, and are also examples of an alert that provides a prompt to avoid traveling along the planned traveling route.

Next, the second modified example of the alerting process is described. As illustrated in FIG. 7B, the ECU 3 determines whether the gradient r is equal to or larger than a threshold β1 at any point on the navigation route already set in the navigation device 60 (Step S31a). The threshold $1 is larger than the threshold β by a predetermined value. The threshold β1 is an example of the gradient threshold. For example, the threshold β1 is 12%. When the result of the determination in Step S31a is "Yes", that is, when the upward gradient is relatively large at any point on the navigation route, the ECU 3 executes the process of Step S32. When the result of the determination in Step S31a is "No", that is, when the upward gradient r is equal to or larger than the threshold β but smaller than the threshold β1, the ECU 3 executes the process of Step S33. In this manner, the alert may be emphasized as the upward gradient on the navigation route increases without a prompt to change the navigation route already set in the navigation device 60.

Process for Calculating Towing Weight f

Figure 9:
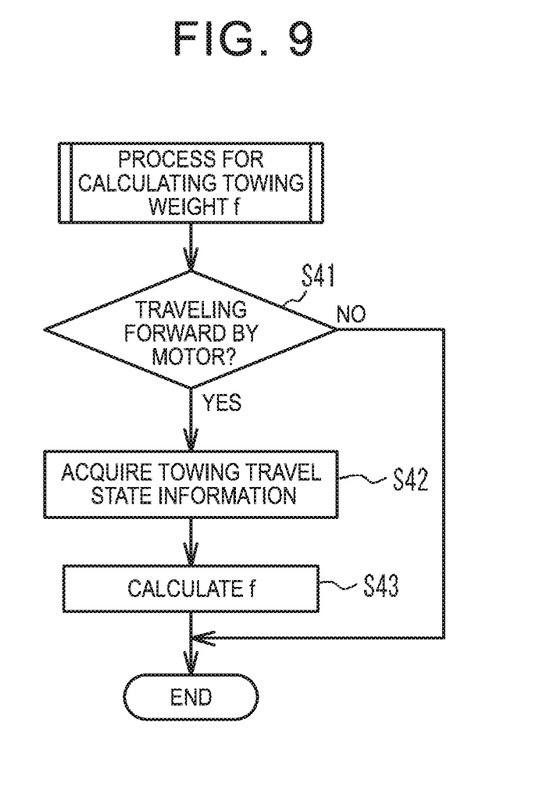
FIG. 9 is a flowchart illustrating an example of a process for calculating a towing weight.

Next, the process for calculating the towing weight f is described. FIG. 9 is a flowchart illustrating an example of the process for calculating the towing weight f. The ECU 3 determines whether the fuel cell vehicle 1 is traveling forward through driving by the motor 50 (Step S41). This determination is made because towing travel state information described later for the calculation of the towing weight f cannot be acquired when the motor 50 is stopped or performing a regenerative operation. The regenerative operation is an operation in which, when the fuel cell vehicle 1 is decelerated or traveling down a slope, the motor 50 is operated as a generator to obtain a braking force of the fuel cell vehicle 1 and the BAT 8 is charged with at least a part of regenerated electric power. In the process of Step S41, the ECU 3 specifically determines whether the fuel cell vehicle 1 is traveling forward through the driving by the motor 50 based on a vehicle speed indicated by a vehicle speed sensor and power consumption of the motor 50. When the vehicle speed indicated by the vehicle speed sensor is larger than zero and the power consumption of the motor 50 is larger than zero, the ECU 3 determines that the fuel cell vehicle 1 is traveling forward through the driving by the motor 50. The power consumption of the motor 50 can be calculated based on a drive current and a rotation speed of the motor 50. When the result of the determination in Step S41 is "No", the control is terminated.

When the result of the determination in Step S41 is "Yes", the ECU 3 acquires the towing travel state information (Step S42). The towing travel state information includes an inclination angle of a road where the fuel cell vehicle 1 is traveling in a towing travel state in which the fuel cell vehicle 1 travels while towing the towed vehicle 100, and a torque of the motor 50 and a vehicle speed of the fuel cell vehicle 1 when the fuel cell vehicle 1 is traveling in the towing travel state along the road having that inclination angle. The road inclination angle [rad] can be acquired from an inclination angle sensor of the fuel cell vehicle 1. For example, the torque of the motor 50 [N] can be calculated by dividing the power consumption of the motor 50 [W] by the rotation speed of the motor 50 [r/min] and multiplying a resultant value by a predetermined coefficient. As described above, the power consumption of the motor 50 can be calculated based on the drive current and the rotation speed of the motor 50. The drive current of the motor 50 may be acquired from a current sensor attached to the motor 50. The rotation speed of the motor 50 can be acquired from a rotation speed sensor provided on the motor 50. The vehicle speed [km/h] can be acquired from the vehicle speed sensor of the fuel cell vehicle 1. The process of Step S42 is an example of a process to be executed by the information acquirer.

Figure 10:
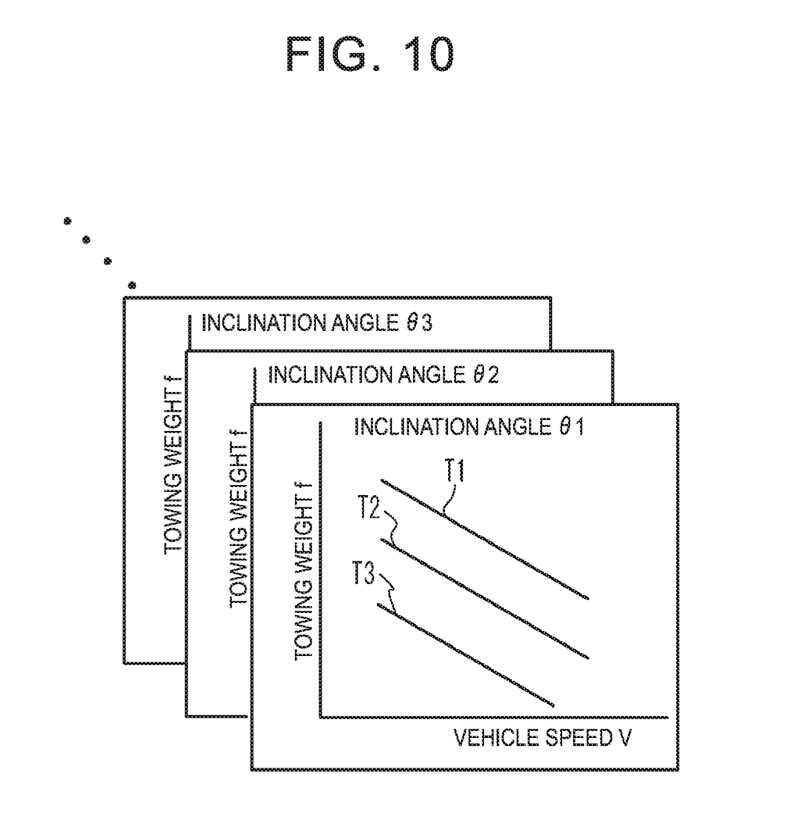
FIG. 10 is a diagram illustrating an example of a plurality of maps that defines motor torques, vehicle speeds, and towing weights for respective road inclination angles.

Next, the ECU 3 calculates the towing weight f based on the towing travel state information with reference to a map (Step S43). FIG. 10 is a diagram illustrating an example of a plurality of maps that defines torques of the motor 50, vehicle speeds, and towing weights f for respective road inclination angles θ1, θ2, θ3 . . . . The maps are prestored in a memory of the ECU 3. The memory of the ECU 3 is an example of the storage. The inclination angles θ1, θ2, θ3, . . . include inclination angles of upward gradients and inclination angles of downward gradients. The inclination angle θ1 in the map illustrated in FIG. 10 is an inclination angle of an upward gradient.

Each map shows torque isopleths T1 to T3. Among the torque isopleths T1 to T3, the torque isopleth T1 indicates a largest torque, and the torque isopleth T3 indicates a smallest torque. The inclination angles include inclination angles of upward gradients and inclination angles of downward gradients. In a map showing an inclination angle of an upward gradient, a towing weight f having a larger value is defined as the torque of the motor 50 increases, as the vehicle speed decreases, and as the inclination angle of the upward gradient decreases. The reasons are as follows. As the towing weight f increases, the torque of the motor 50 that is necessary to tow the towed vehicle 100 tends to increase. As the towing weight f increases, the vehicle speed tends to decrease. Under the same conditions of the torque of the motor 50 and the vehicle speed, the towing weight f increases as the inclination angle of the upward gradient decreases. In a map showing an inclination angle of a gentle downward gradient, a towing weight f having a larger value is similarly defined as the torque of the motor 50 increases, as the vehicle speed decreases, and as the inclination angle of the downward gradient decreases. The case of the inclination angle of the gentle downward gradient is similar to the case of the inclination angle of the upward gradient because action of gravity has small influence on acceleration and the rolling resistance is high. In a map showing an inclination angle of a steep downward gradient, a towing weight f having a larger value is defined as the torque of the motor 50 decreases, as the vehicle speed increases, and as the inclination angle of the downward gradient decreases. The reason is as follows. In this case, the acceleration increases due to the action of gravity, and the rolling resistance decreases. Thus, the towed vehicle 100 can be towed even if the torque of the motor 50 is small. By calculating the towing weight f with reference to the maps described above, the process load of the ECU 3 can be reduced.

Modified Example of Process for Calculating Towing Weight f

The towing weight f may be calculated by using Arithmetic Expression (1).

$$f=\{(T \times Gr \div D - Ra)/(g(\mu + \sin\theta) + a)\} - F \qquad (1)$$

Arithmetic Expression (1) is stored in the memory of the ECU 3. The symbol "θ" [rad] represents an inclination angle of a road where the fuel cell vehicle 1 is currently traveling. As described above, the road inclination angle can be acquired from the inclination angle sensor of the fuel cell vehicle 1. The symbol "T" [N·m] represents a torque of the motor 50 when the fuel cell vehicle 1 is traveling in the towing travel state along the road having the inclination angle described above. The symbol "Gr" [-] represents a gear ratio of the transmission 52 when the fuel cell vehicle 1 is traveling in the towing travel state along the road having the inclination angle described above. When the gear ratio of the transmission 52 is fixed, the gear ratio is prestored in the memory of the ECU 3 as a constant value. When the transmission 52 is a multi-stage transmission having a plurality of switchable gear ratios, the gear ratio is detected by using a sensor or the like. The symbol "D" [m] represents an outside diameter of each wheel 55, which is prestored in the memory of the ECU 3 as a characteristic value of the fuel cell vehicle 1. The symbol "Ra" [N] represents an air resistance of the fuel cell vehicle 1 when the fuel cell vehicle 1 is traveling in the towing travel state along the road having the inclination angle described above. The air resistance exponentially increases as the vehicle speed increases. The memory of the ECU 3 stores a map that defines a relationship between the air resistance and the vehicle speed. The air resistance can be calculated from a current vehicle speed with reference to the map.

The symbol "g" [m/s$^2$] represents a gravitational acceleration, which is prestored in the memory of the ECU 3. The symbol "μ" [-] represents a rolling resistance coefficient, which is prestored in the memory of the ECU 3 as a characteristic value of the fuel cell vehicle 1. The symbol "a" [m/s$^2$] represents an acceleration of the fuel cell vehicle 1 when the fuel cell vehicle 1 is traveling in the towing travel state along the road having the inclination angle described above. The acceleration may be detected by using an acceleration sensor mounted on the fuel cell vehicle 1. The symbol "F" [kg] represents a weight of the fuel cell vehicle 1, which is prestored in the memory of the ECU 3 as a characteristic value of the fuel cell vehicle 1. By using the arithmetic expression, the towing weight f can be calculated accurately.

Others

The images D1 to D7 are displayed with the instrument panel display 9 used as the notifier, but the present disclosure is not limited to this case. For example, an alert may be issued by displaying any one of the images D1 to D7 with the navigation display 61 used as the notifier. Further, the loudspeaker provided in the vehicle cabin or a loudspeaker provided in the navigation device 60 may be used as the notifier, and the alert may be issued by outputting the message in any one of the images D1 to D7 by voice through the loudspeaker. The alert may be issued through the image display or the voice output alone. Further, the alert may be issued by causing the instrument panel display 9 or the like to display a predetermined symbol, shape, or mark. Still further, a lighting device such as a light-emitting diode (LED) provided in the vehicle cabin may be used as the notifier, and the alert may be issued by turning ON the lighting device or changing a lighting pattern of the lighting device to blink the lighting device, for example. Still further, the alert may be issued by using a beeping sound through the loudspeaker. To issue the alert with emphasis, the symbol to be displayed on the instrument panel display 9 or the like may be enlarged or flashed, the beeping sound may be set louder, the type of the beeper may be changed, or the lighting pattern of the LED may be changed.

As in Steps S1 and S2, the towing weight f is calculated, and determination is made whether the fuel cell vehicle 1 is towing a towed vehicle based on the magnitude of the towing weight f. The present disclosure is not limited to this case. For example, if a camera is mounted on the fuel cell vehicle 1 to capture an image of an area behind the fuel cell vehicle 1, determination may be made whether the fuel cell vehicle 1 is towing a towed vehicle through an image recognition process for the image captured by the camera. Further, a sensor may be provided on the hitch 2a at a part around the hitch ball 2b to detect engagement between the hitch ball 2b and the coupler 108, and determination may be made whether the fuel cell vehicle 1 is towing a towed vehicle via the sensor. In any case, the towing weight f needs to be calculated apart from the determination of whether the fuel cell vehicle 1 is towing a towed vehicle.

The thresholds $\alpha$, $\alpha 1$, $\beta$, and $\beta 1$ are fixed values, but the present disclosure is not limited to this case. For example, at least one of the thresholds $\beta$ and $\beta 1$ may decrease as the towing weight f increases. The reason is as follows. As the towing weight f increases, the temperature may increase due to an increase in the power of the FC 4 even if the upward gradient is small. Therefore, the power of the FC 4 may be limited. At least one of the thresholds $\alpha$, $\alpha 1$, $\beta$, and $\beta 1$ may increase as the outside air temperature decreases. The reason is as follows. As the outside air temperature decreases, the heat radiation of the radiator 43 for the coolant is promoted to suppress an increase in the temperature of the FC 4. Therefore, the possibility of the limitation on the power of the FC 4 is reduced.

For example, the ECU 3 may cause the navigation display 61 to emphasize, by flashing, a point where the upward gradient is equal to or larger than the threshold $\alpha$ or $\alpha 1$. Thus, the driver can easily avoid traveling through this point.

The ECU 3 may cause the instrument panel display 9 or the like to display the calculated towing weight f.

The fuel cell vehicle 1 is a passenger automobile, which may be a large-sized passenger automobile, a medium-sized passenger automobile, or a small-sized passenger automobile. A fuel cell vehicle other than the passenger automobile may be employed as long as the fuel cell vehicle does not have a sensor or the like configured to directly detect the towing weight.

Although the embodiment of the present disclosure is described above in detail, the present disclosure is not limited to the specific embodiment, but various modifications and changes may be made within the scope of the present disclosure described in the claims.

What is claimed is:

1. A control device for a fuel cell vehicle including a fuel cell as an electric power source and a motor as a drive source, the control device comprising:
    a power limiter configured to limit power of the fuel cell when a temperature correlation value correlated to a temperature of the fuel cell indicates that the temperature is equal to or higher than a temperature threshold;
    a calculation unit configured to calculate a weight of a towed vehicle that is towed by the fuel cell vehicle;
    a gradient acquirer configured to acquire upward gradients at respective points on a planned traveling route of the fuel cell vehicle;
    a predictor configured to predict, based on the weight of the towed vehicle and the upward gradients, whether the power limiter limits the power of the fuel cell when the fuel cell vehicle is traveling along the planned traveling route in a towing travel state in which the fuel cell vehicle travels while towing the towed vehicle; and
    a controller programmed such that, when the predictor predicts that the power of the fuel cell is limited, the controller issues, through a notifier mounted on the fuel cell vehicle, an alert that a vehicle speed of the fuel cell vehicle is expected to decrease before the vehicle speed of the fuel cell vehicle is decreased when the fuel cell vehicle is traveling along the planned traveling route in the towing travel state,
    wherein the controller is programmed to issue the alert with emphasis through the notifier as the weight of the towed vehicle increases, and
    wherein the controller is further programmed to identify a first threshold of weight and a second threshold of weight, with the second threshold of weight being larger than the first threshold of weight, and issue the alert with a greater emphasis when the weight of the towed vehicle is equal to or larger than the second threshold of weight than when the weight of the towed vehicle is equal to or larger than the first threshold of weight and less than the second threshold of weight.

2. The control device according to claim 1, wherein the predictor is configured to predict that the power of the fuel cell is limited when the weight of the towed vehicle is equal to or larger than a weight threshold and when at least one of the upward gradients at the respective points is equal to or larger than a gradient threshold.

3. The control device according to claim 1, further comprising an information acquirer configured to acquire towing travel state information including an inclination angle of a road where the fuel cell vehicle is traveling in the towing travel state, and a torque of the motor when the fuel cell vehicle is traveling in the towing travel state along the road having the inclination angle, wherein the calculation unit is configured to calculate the weight of the towed vehicle based on the towing travel state information.

4. The control device according to claim 3, wherein the towing travel state information includes the vehicle speed of the fuel cell vehicle when the fuel cell vehicle is traveling in the towing travel state along the road having the inclination angle.

5. The control device according to claim 4, further comprising a storage that stores a map that defines a relationship among the torque, the inclination angle, the vehicle speed, and the weight of the towed vehicle, wherein the calculation unit is configured to calculate the weight of the towed vehicle with reference to the map.

6. The control device according to claim 3, wherein the towing travel state information includes a weight of the fuel cell vehicle, and an air resistance of the fuel cell vehicle, an acceleration of the fuel cell vehicle, and a gear ratio of a transmission of the fuel cell vehicle when the fuel cell vehicle is traveling in the towing travel state along the road having the inclination angle.

7. The control device according to claim 6, further comprising a storage that stores an arithmetic expression that defines a relationship among the torque, the inclination angle, the weight, the air resistance, the acceleration, and the gear ratio of the fuel cell vehicle, and the weight of the towed vehicle, wherein the calculation unit is configured to calculate the weight of the towed vehicle based on the arithmetic expression.

8. The control device according to claim 1, wherein the controller is programmed to issue, through the notifier, an additional alert that provides a prompt to avoid traveling along the planned traveling route.

9. The control device according to claim 1, wherein the controller is programmed to issue the alert with emphasis through the notifier as the upward gradients increase.

10. The control device according to claim 1, wherein the gradient acquirer is configured to acquire the upward gradients from a navigation device in which the planned traveling route is set.

11. The control device according to claim 10, wherein the controller is programmed such that, when the predictor predicts that the power of the fuel cell is limited, the controller issues, through the notifier, an additional alert that provides a prompt to change the planned traveling route set in the navigation device.

12. The control device according to claim 1, wherein the fuel cell vehicle is a passenger automobile.

13. A fuel cell vehicle comprising:
a fuel cell;
a motor; and
the control device according to claim 1.

14. The control device according to claim 1, wherein the notifier is disposed within a cabin of the fuel cell vehicle.

15. A control device for a fuel cell vehicle including a fuel cell as an electric power source and a motor as a drive source, the control device comprising:
a power limiter configured to limit power of the fuel cell when a temperature correlation value correlated to a temperature of the fuel cell indicates that the temperature is equal to or higher than a temperature threshold;
a calculation unit configured to calculate a weight of a towed vehicle that is towed by the fuel cell vehicle;
a gradient acquirer configured to acquire upward gradients at respective points on a planned traveling route of the fuel cell vehicle;
a predictor configured to predict, based on the weight of the towed vehicle and the upward gradients, whether the power limiter limits the power of the fuel cell when the fuel cell vehicle is traveling along the planned traveling route in a towing travel state in which the fuel cell vehicle travels while towing the towed vehicle; and
a controller programmed such that, when the predictor predicts that the power of the fuel cell is limited, the controller issues, through a notifier mounted on the fuel cell vehicle, an alert that a vehicle speed of the fuel cell vehicle is expected to decrease before the vehicle speed of the fuel cell vehicle is decreased when the fuel cell vehicle is traveling along the planned traveling route in the towing travel state,
wherein the controller is programmed to issue the alert with emphasis through the notifier as the upward gradients increase, and
wherein the controller is further programmed to identify a first threshold of upward gradient and a second threshold of upward gradient, with the second threshold of upward gradient being larger than the first threshold of upward gradient, and issue the alert with a greater emphasis when the upward gradient is equal to or larger than the second threshold of upward gradient than when the upward gradient is equal to or larger than the first threshold of upward gradient and less than the second threshold of upward gradient.

* * * * *